April 6, 1937. 2,076,327
YÜRGEN, BARON SILBERG VON STACKELBERG
AIRCRAFT
Filed July 28, 1934 11 Sheets-Sheet 3
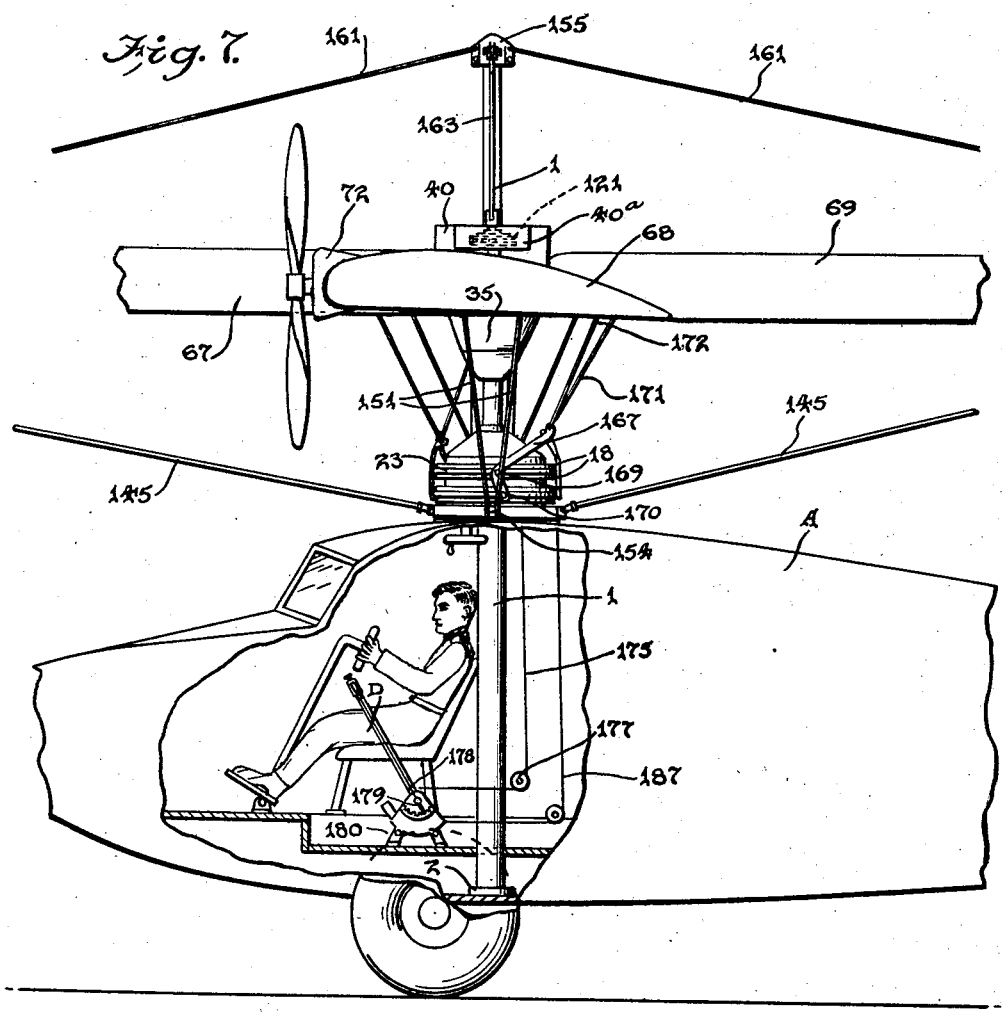
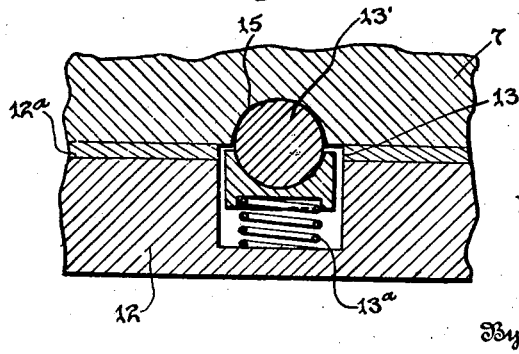
Inventor
Yurgen, Baron Silberg von Stackelberg
By Luke A. Mattare
Attorney

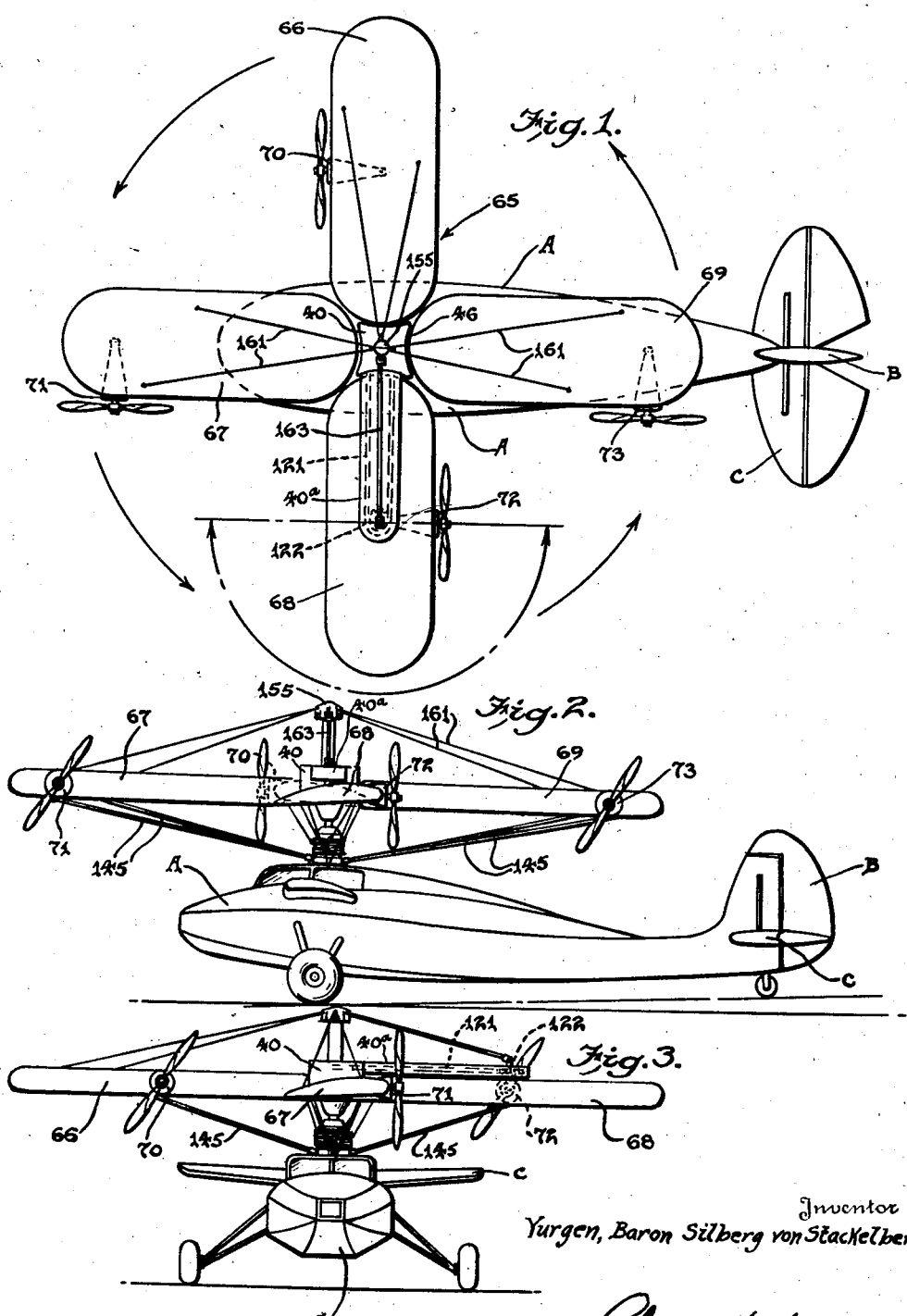

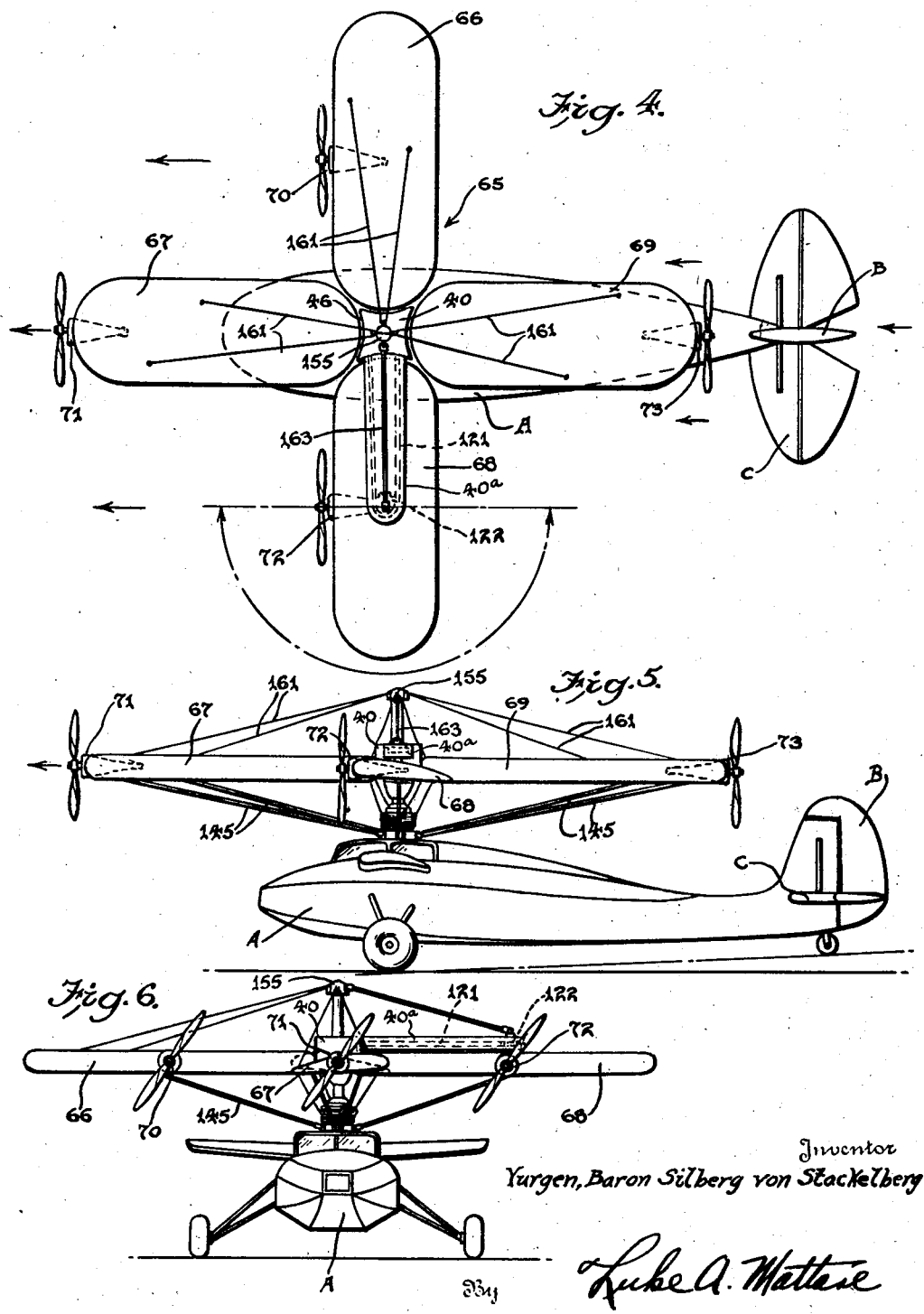

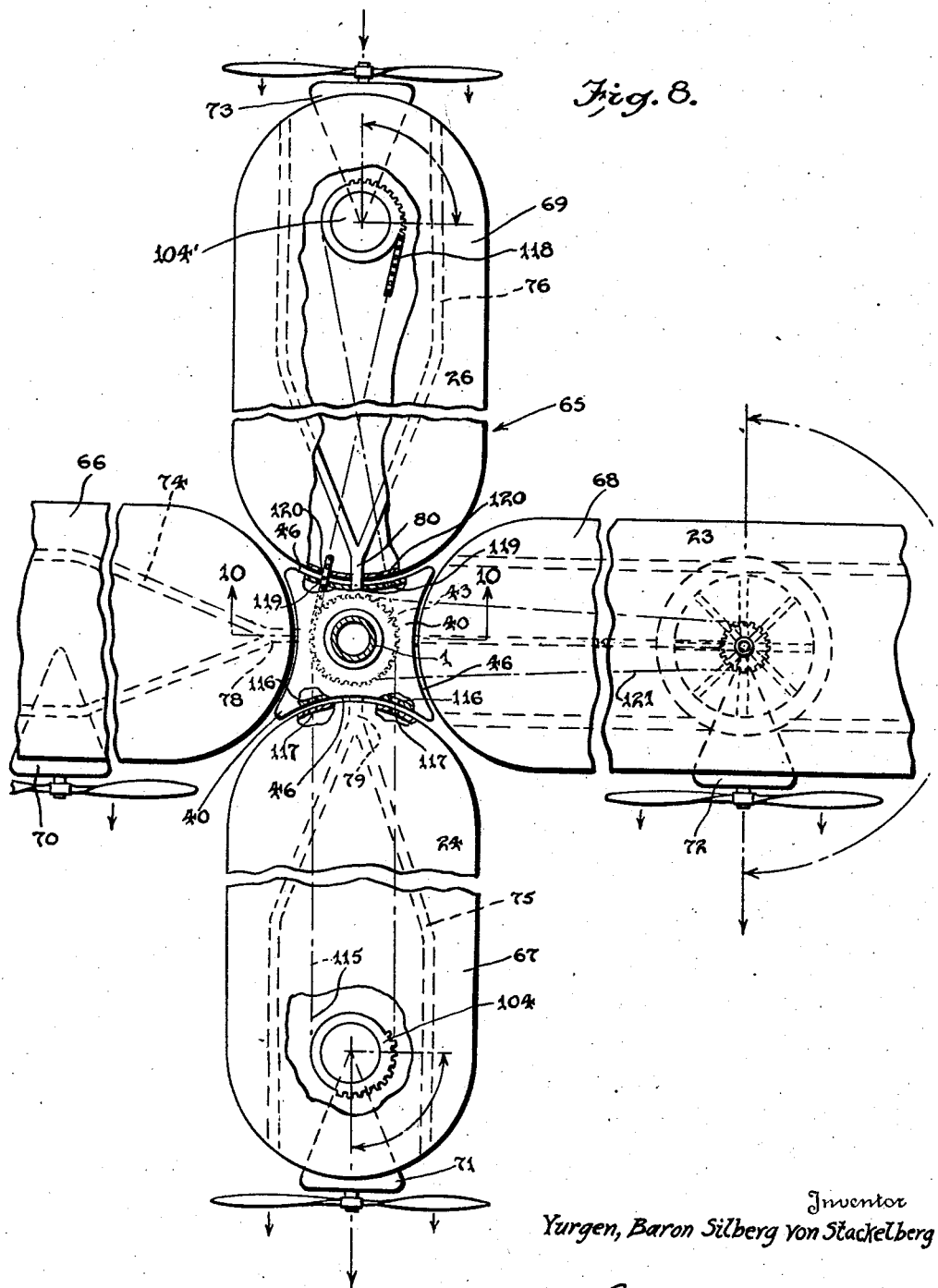

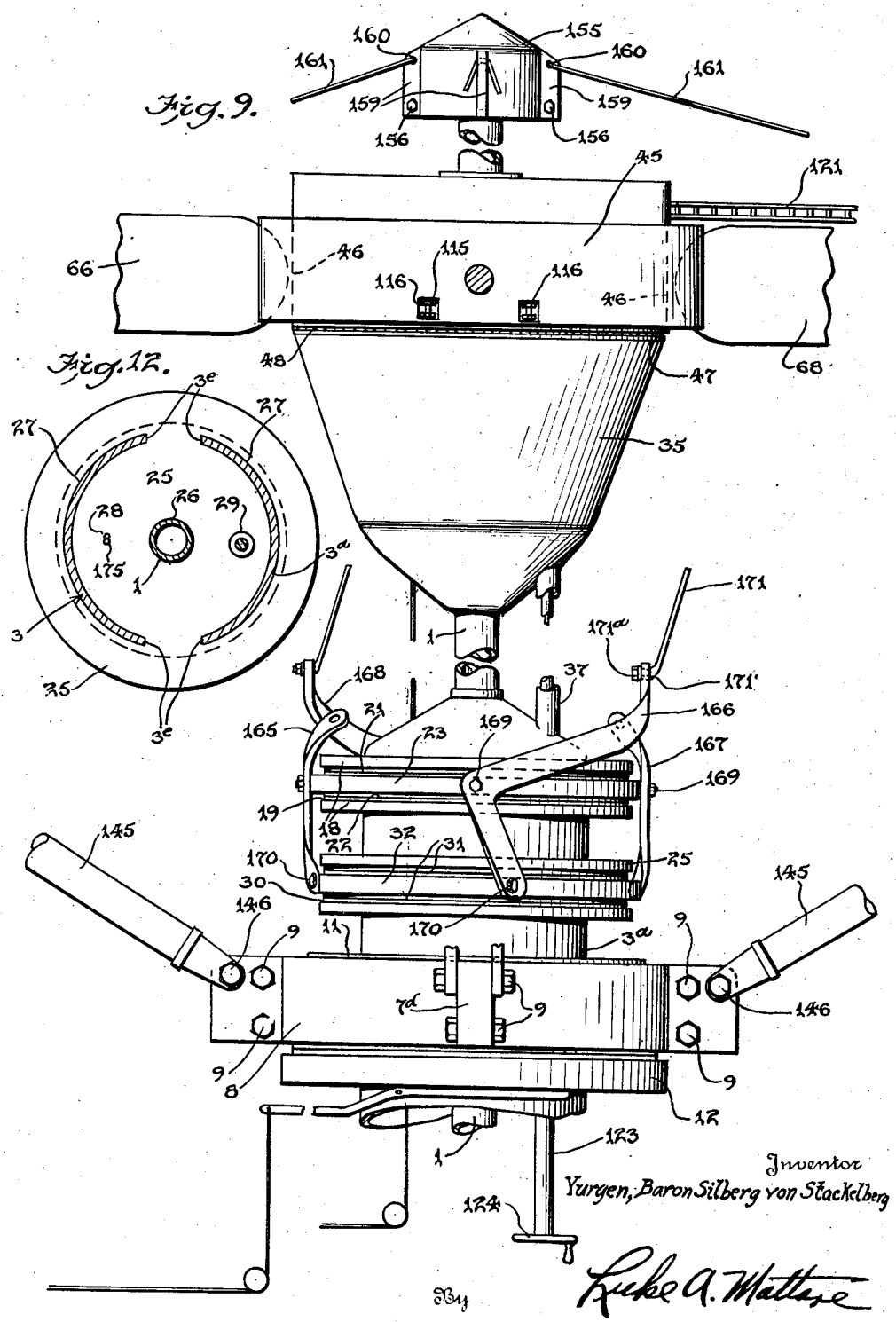

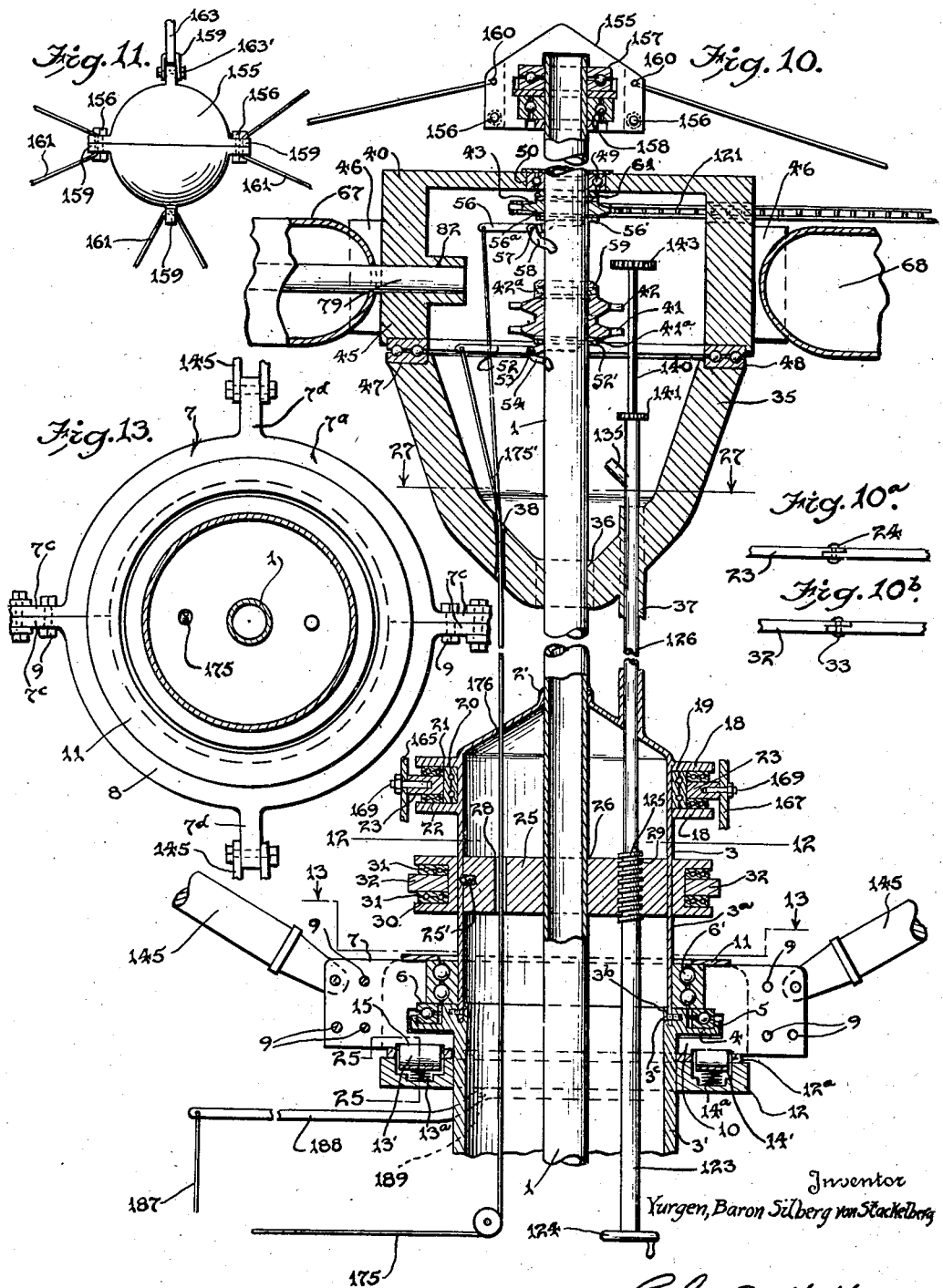

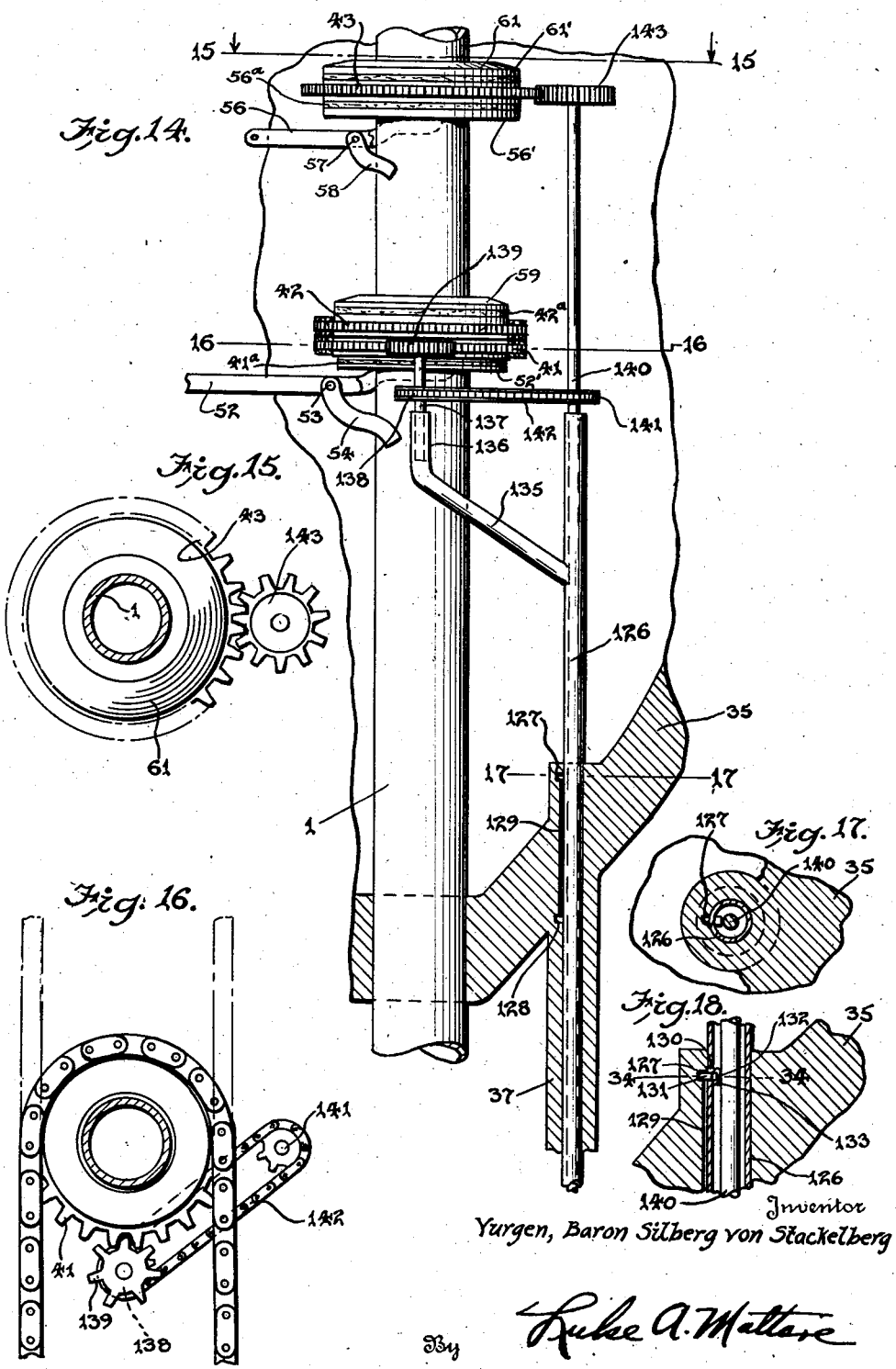

April 6, 1937.  YÜRGEN, BARON SILBERG VON STACKELBERG  2,076,327
AIRCRAFT
Filed July 28, 1934   11 Sheets-Sheet 8
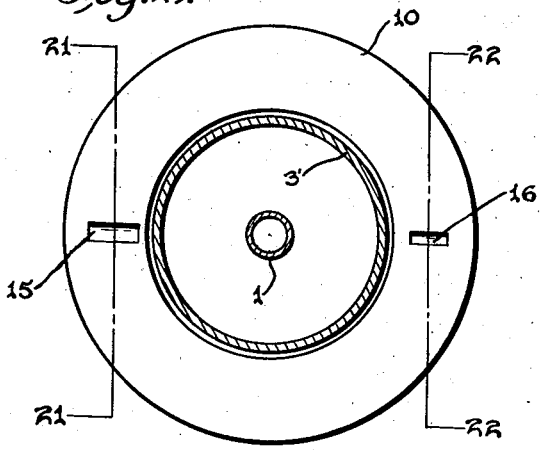
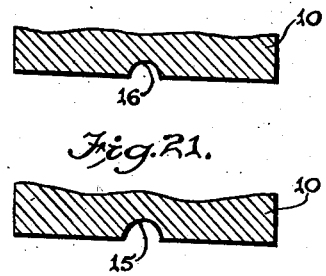
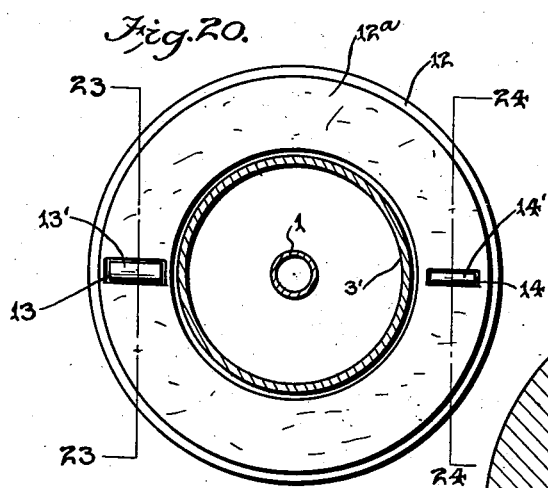
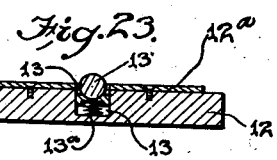
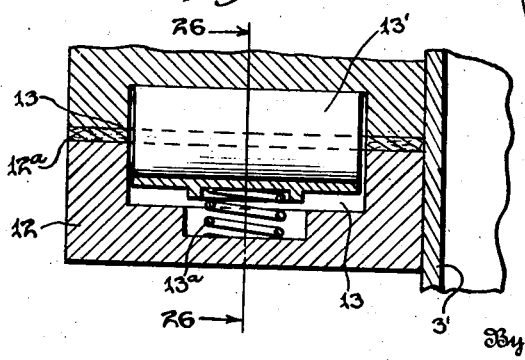
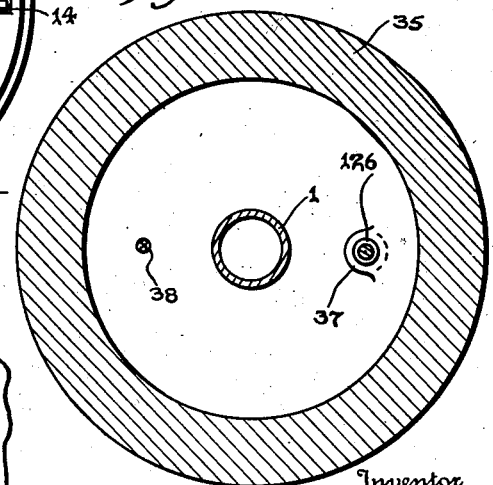
Inventor
Yurgen, Baron Silberg von Stackelberg,
By Luke A. Mattare
Attorney

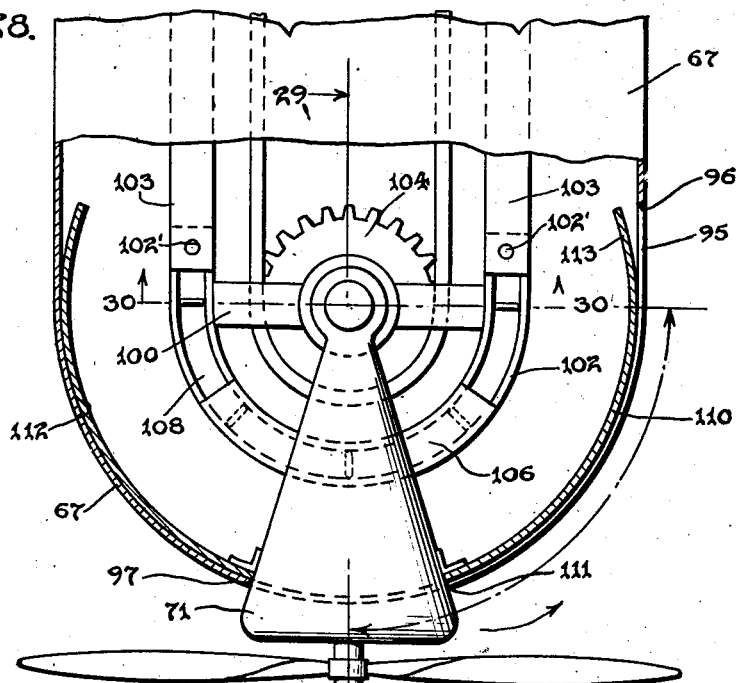
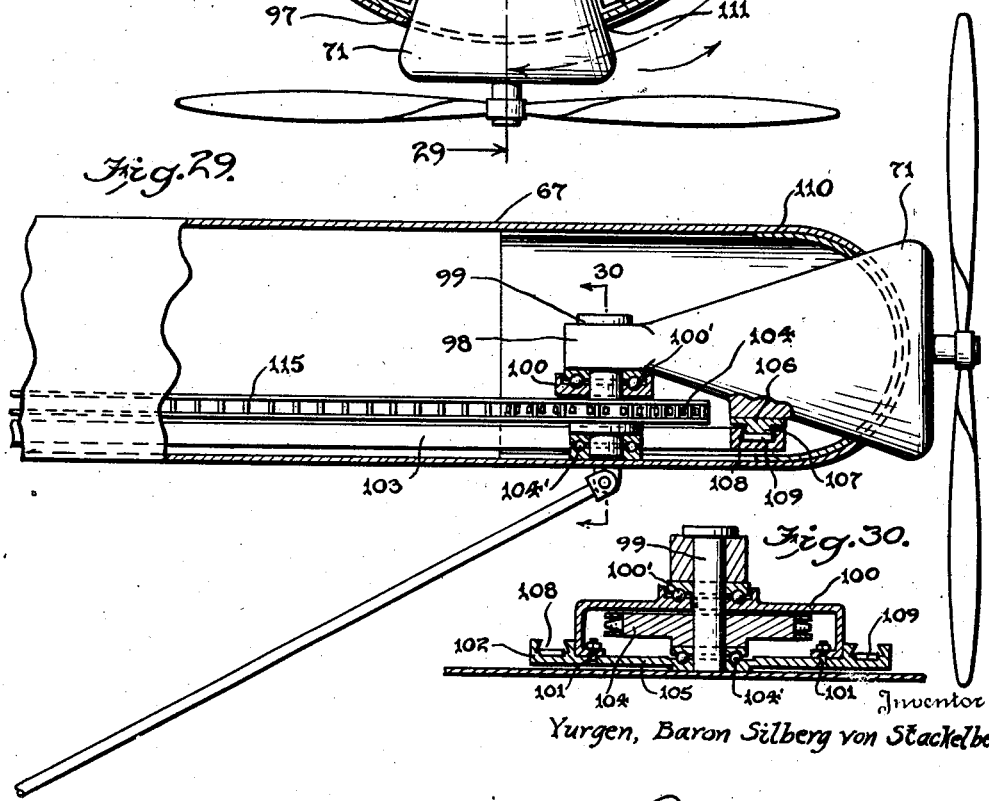

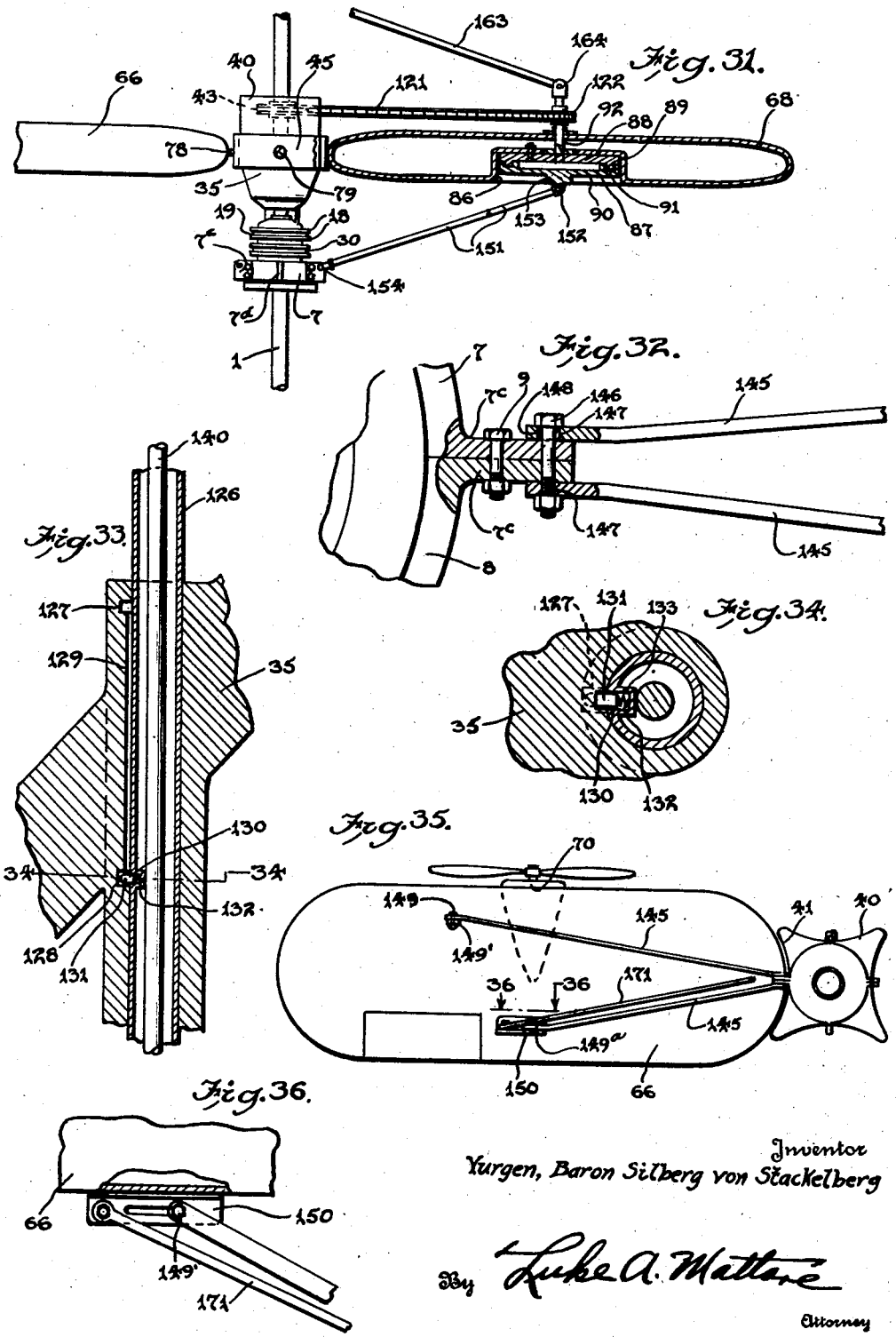

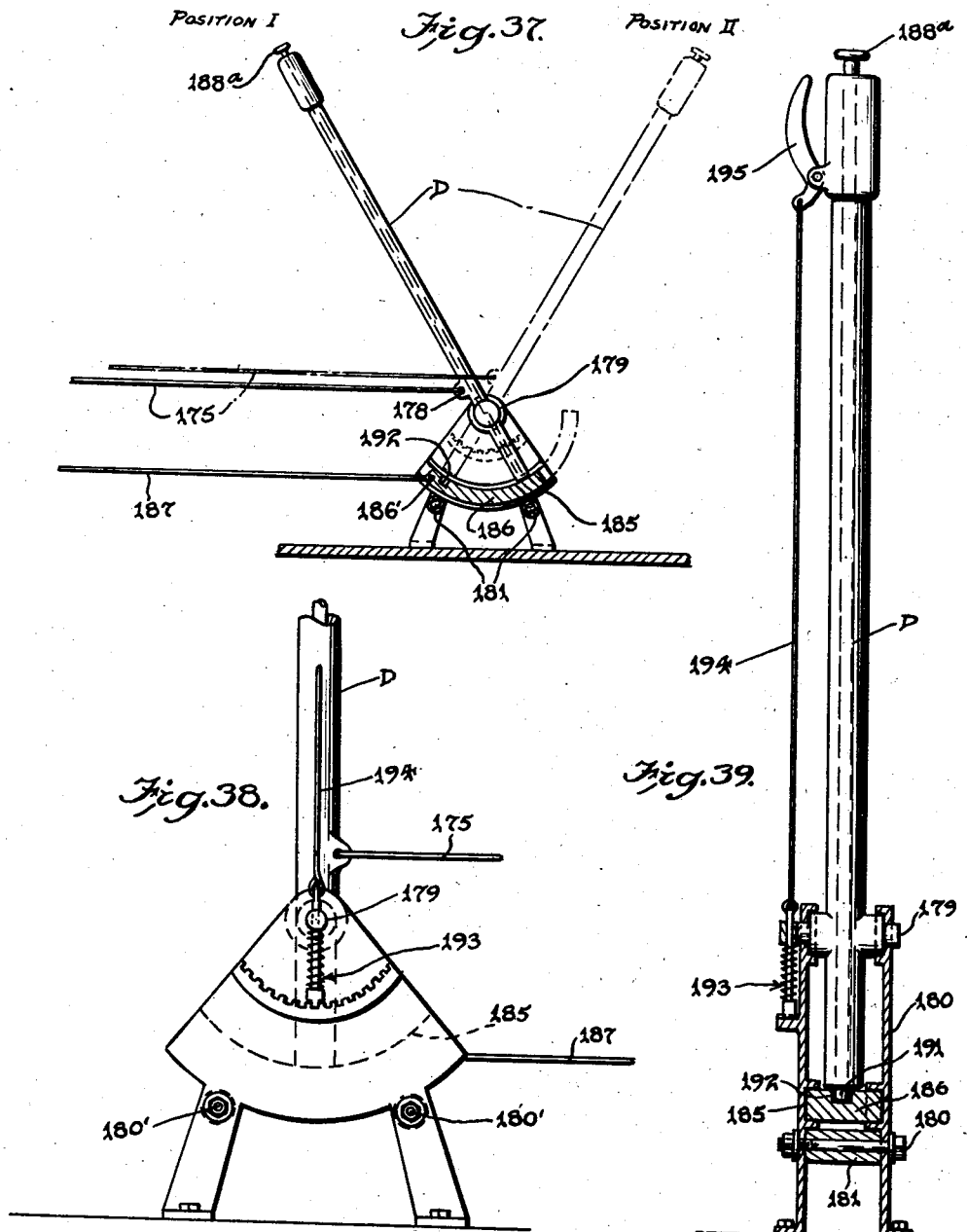

Patented Apr. 6, 1937

2,076,327

UNITED STATES PATENT OFFICE 2,076,327

AIRCRAFT

Yürgen Baron Silberg von Stackelberg, Baltimore, Md., assignor of one-half to Margaret G. Doll, Baltimore, Md.

Application July 28, 1934, Serial No. 737,429

12 Claims. (Cl. 244—7)

This invention relates to aircraft, and more particularly to a flying machine which can be piloted in the same manner as conventional aeroplanes, as regards take-offs, landings, and horizontal flying etc.; also embodying the helicopter principle so that vertical, or substantially vertical, rising into the air and subsequent similar landing may be effected, respectively, from and on a restricted area; and further that the machine may hover; and also embodying the auto-gyro principle so that in the event of failure of motive power, a safe descent may be effected.

In my invention I provide means whereby when vertical, or substantially vertical ascent has been made, and the desired altitude attained, the machine can be converted, while hovering, or, while in flight, so that horizontal flight may be had as in conventional aeroplanes, and if desired, then reconverted, while in flight so that a vertical or substantially vertical ascent or descent may be made, or the landing may be made in the same manner as is customary with conventional aeroplanes, and in the event of failure of the motive power, auto-rotation of the sustaining blades is effected and a safe descent thereby made.

My machine is also capable of taking-off as is customary with conventional aeroplanes, and when proper altitude has been attained, converting the same to the helicopter principle, so as to hover, or to ascend or descend vertically, or substantially vertically. In other words, I have devised a machine which may be converted, and reconverted at will, while grounded, while hovering, or in flight, respectively, into a helicopter, or an aeroplane or vice-versa, and, as before stated, during flight, in event of failure of motive power, auto-rotation will be effected, and consequent safe landing.

The primary object of the present invention, therefore, is to provide a flying machine, whereby the same can be operated as a conventional aeroplane, or as a helicopter, or an auto-gyro, and be converted, instantly, at will, from one to the other.

Another object of the present invention is to provide a flying-machine embodying numerous novel details of construction, that from a practical standpoint make it possible for the same to be used in the same manner as conventional aeroplanes, and also to be used as a helicopter, or an auto-gyro, and be converted, instantly, at will, from one to the other.

Another object of the invention is to provide a rotatable multi-bladed assembly, which can be associated with the fuselage of the plane, as a unit.

Another object of the invention resides in providing a novel braking means for stopping rotation of the unitary multi-blade assembly.

Another object of the invention is to provide a novel braking or clutching means for gearing so that in the event of or failure of proper actuation of the gears, etc., a slipping action will take place and thereby not disrupt, break or harm any of the various rotating parts.

Another object of the invention is to provide a braking means which will effect stoppage of the multi-blade assembly in a predetermined position with respect to the fuselage.

To the accomplishment of the foregoing and such other objects as may hereinafter appear, this invention consists in the construction, combination and arrangement of parts hereinafter described and then sought to be defined in the appended claims, reference being had to the accompanying drawings which show, merely for the purpose of illustrative disclosure, one embodiment of this invention, it being expressly understood, however, that various modifications and changes may be made in practice within the scope of the claims without digressing from my inventive idea.

In the drawings:—

Figure 1 is a top plan view of an aircraft to which my improvement has been applied, showing the same in position to be flown as a helicopter; Fig. 2 is a side elevation of the aircraft shown in Fig. 1, and Fig. 3 is a front elevation of the aircraft shown in Fig. 1.

Fig. 4 is a top plan view showing the aircraft in position to be flown as a conventional aeroplane; Fig. 5 is a side elevation of the machine shown in Fig. 4; and Fig. 6 is a front elevation of the machine shown in Fig. 4.

Fig. 7 is a side elevation showing part of the fuselage broken away so as to disclose the operating or control lever and control wheel.

Fig. 8 is a top plan view of the rotatable wing assembly.

Fig. 9 is an enlarged side elevation showing the rotatable hub strut supporting means and part of the mechanism for obtaining angularity or inclination of the blades.

Fig. 10 is a vertical sectional view of the supporting standard and the mechanisms associated therewith; Figs. 10ª and 10ᵇ are side elevational views of the two-part rings.

Fig. 11 is a top plan detail of the rotatable brace wire and strut attaching cap.

Fig. 12 is a view, looking down, taken on the lines 12—12 of Fig. 10 showing the vertically movable disk which forms part of the mechanism for effecting inclination of the blades.

Fig. 13 is a view taken on the lines 13—13 of Fig. 10 looking in the direction of the arrows.

Fig. 14 is a side elevation, partly in section of the gearing, etc. for effecting inclination of the blades, etc.

Fig. 15 is a view taken on the lines 15—15 of Fig. 14, looking down.

Fig. 16 is a view taken on the lines 16—16 of Fig. 14, looking down.

Fig. 17 is a view taken on the lines 17—17 of Fig. 14 showing the means for locking the operating mechanism in its upper position; and Fig. 18 is a vertical sectional view of the same.

Figs. 19 and 20 are plan views of the means for braking or stopping rotation of the wing assembly; Fig. 21 is a sectional view taken on the lines 21—21 of Fig. 19; Fig. 22 is a sectional view taken on the lines 22—22 of Fig. 19; Fig. 23 is a sectional view taken on the lines 23—23 of Fig. 20; Fig. 24 is a sectional view taken on the lines 24—24 of Fig. 20; Fig. 25 is a vertical sectional view taken on the lines 25—25 of Fig. 10 and Fig. 26 is a sectional view taken on the lines 26—26 of Fig. 25, looking in the direction of the arrows.

Fig. 27 is a cross sectional view taken on the lines 27—27 of Fig. 10.

Fig. 28 is a top plan view partly in section showing mounting for motor adjacent the end of one of the blades; Fig. 29 is a vertical sectional view taken on the lines 29—29 of Fig. 28; Fig. 30 is a vertical sectional view taken on the lines 30—30 of Fig. 29 looking in the direction of the arrows.

Fig. 31 is a side elevational view partly in section showing the mounting of one of the blades.

Fig. 32 is a plan view partly in section showing the manner of attaching the struts to the rotatable brake supporting hub.

Fig. 33 is an enlarged vertical sectional view showing the locking means in Figs. 17 and 18; Fig. 34 is an enlarged cross-sectional view taken on the lines 34—34 of Fig. 18.

Fig. 35 is a bottom plan view of one of the blades showing the manner of attaching the struts thereto; and Fig. 36 is an enlarged detail in side elevation of the same; and Figs. 37, 38 and 39 show the manner of mounting the operating and control lever.

The invention will be more readily understood by referring to the drawings which are described in detail as follows: A denotes the fuselage, of any desired contour, having the usual steering rudder B and horizontal rudder C which are controlled in the customary manner.

A vertical standard 1, preferably hollow and round, is fixedly secured such as shown at 2, to the bottom of the interior of the body of the plane, and extends vertically upwardly a substantial distance beyond the top of the body of the plane, as shown. A hollow cylindrical casing 3 which is fixedly secured to standard 1 as at 2' as by welding, rivets, or in any desired manner, surrounds a portion of the standard 1, immediately above the top of the body of the plane, and encloses and supports mechanisms, presently to be described. The casing 3 is formed of two parts, or sections, 3' and 3ª, for a purpose later seen, the part 3ª being secured in a groove 3ᵇ as by welding, rivets, or bolts or the like 3ᶜ. The section 3ª of the casing is cut-out, or rather has relatively wide vertical slots 3ᵉ at diametrically opposite points throughout a portion of its length, for a purpose later seen. The casing section 3' is provided with an integral circumferential flange 4 adjacent its upper end, and has a channel 5 therearound, in which channel a two-part ball-race 6 is positioned.

A freely rotatable strut-anchoring-supporting and brake hub or collar 7 comprising semi-circular sections 7ª and 8 surrounds the flange 4, and the two-part sections thereof are secured together as by bolts 9 which extend through radially outwardly extending integral lugs 7ᶜ. Each of the semi-circular sections of the hub are provided intermediate their ends with other integral radially outwardly extending lugs 7ᵈ, thereby providing four diametrically disposed radially outwardly extending lugs for supporting and anchoring struts later referred to. The hub has a relatively wide flange 10 which is part of a brake mechanism and which is parallel with and slightly spaced from the underside of the circumferential flange 4, and extends toward, and slightly spaced from the casing 3, and overlies a portion of the ball race 6 and is spaced from the periphery of the casing 3, providing a space surrounding the casing, into which space a two-part ball race 6' is positioned, filling such space and engaging the casing 3, as shown. A two-part ring 11 may be secured to the top of the hub 7 in any desired manner, and serves to protect the ball races from the elements.

A vertically movable brake shoe or ring 12 surrounds the casing 3 below the hub 7 and is provided on its upper face with a friction lining 12ª adapted in one position to frictionally engage the under-side of the hub. The lining 12ª is secured to brake ring 12 in any desired manner. The brake ring 12 and the lining therefor are cut-out to provide oppositely disposed elongated cavities 13 and 14, see Figs. 19 to 26, inclusive, into which a large roller 13' and a smaller roller 14' are positioned and normally spring-pressed outwardly by means of springs 13ª and 14ª, respectively. The said rollers 13' and 14' are adapted for engagement with complementary large and small recesses 15 and 16, respectively, formed in the underside of the hub flange 10, thereby providing braking and stopping means for the rotatable multi-blade assembly hereinafter described in detail, and also making it possible to stop rotation of the multi-blade assembly so that the blades will automatically assume correct predetermined position and arrangement with respect to the fuselage whereby the plane may safely be converted from the helicopter principle to that of a conventional aeroplane capable of horizontal flying.

Adjacent the upper end of casing 3 there are two spaced circumferential flanges 18, forming therebetween a circumferential groove 19, into which a two-part rear ball race 20 is positioned, and also an upper ball race 21 and a lower ball race 22 spaced so as to provide a circumferential opening into which opening or space a ring 23 is arranged for free rotation. The ring 23 is in two parts to permit insertion and is held together by bolts or other desirable securing means 24. Intermediate the rotatable hub 7 and the lowermost flange 18, there is a relatively thick vertically movable disk 25 provided with a central opening 26 through which the standard 1 extends. Two oppositely disposed arcuate slots 27 are formed in the disk 25 through which the casing 3 extends, see Fig. 12, it being understood that the disk 25 is mounted on the casing section 3ᵃ before the same is attached to casing section 3'. The disk 25 is also provided with an opening 28 and an interiorly screw-threaded opening 29, the screw threads being of the high-pitch high-speed type. As shown, part of disk 25 is interiorly disposed in the casing 3 and a part is exteriorly thereof. The disk 25 is provided with several outwardly spring-pressed locking detents 25' which engage, in its lowermost position, in recesses in the interior side walls of the casing.

The periphery of the exterior portion of the disk 25 is cut out to form a circumferential groove 30, into which upper and lower two-part ball races 31 are fitted and between which ball races a ring 32 is mounted for free rotation. The ring 32 is in two parts and is held together by bolts or rivets 33, or other desirable securing means.

A substantially inverted bell-shaped relatively thick hollow housing 35 comprising a support for the rotatable multi-bladed wing assembly (presently to be described) is fixedly secured at 36, in any desired manner, to and surrounds a portion of the standard 1 above the casing 3, and has its flaring end extending uppermost. A tubular member 37 connects the housing 35 with the casing 3 and an opening 38, the purpose of which is later described, is provided in the lower part of the housing 35. The housing 35 and the rotatable blade supporting hub 40 which surrounds the standard 1 form an enclosure for gearing, etc. Within the said enclosure and surrounding the standard 1 are three freely rotatable superposed gears 41, 42 and 43.

The gears 41 and 42 comprise, as shown, one gear with two sets of teeth thereon. The wing supporting hub 40 is substantially square, in plan, in its upper portion and is provided with a depending flange 45 which is curved at 46 intermediate its corners, to receive the rounded, or curved ends of the blades therein, but slightly spaced therefrom. The lower end of the flange 45 is circular and is complemental and of a corresponding shape to the flared open end 47 of the housing 35 and between which a circular ball-race 48 is positioned. A ball race 49 surrounds the standard 1 and is concentric with a central opening 50 in the hub 40, whereby the blade supporting hub 40 and the entire blade assembly, as a whole, is anti-frictionally mounted for free rotation, when desired.

The freely rotatable gears 41 and 42 are adapted to be locked or clutched to standard 1 by brake operator lever 52 which is connected to a non-rotatable brake ring 52', on the upper face of which suitable friction lining is fixed.

The lever 52 is pivotally mounted at 53 to a projection 54 on the standard. Gear 43 is adapted to be locked to standard 1 by brake operator lever 56 which is also connected to a non-rotatable brake ring 56', on the upper face of which suitable friction lining 56ᵃ is fixed. The lever 56 is pivotally mounted at 57 to a projection 58 on the standard 1. A fixed collar 59 is positioned on the standard 1 above the gears 41 and 42, the lower face of which has brake lining thereon. A brake collar 61 having a friction lining 61' fixed on its lower face is arranged above gear 43 and is fixed to standard 1, in any desired manner. It will be seen that when brake operator levers 52 and 56 are pulled downwardly, rotation of the gears 41, 42 and 43 will be stopped, and the gears will be locked or clutched to the stationary standard 1.

The multi-blade, or wing sustaining assembly, denoted as a whole at 65, comprises similarly shaped, elongated relatively-thick blades 66, 67, 68 and 69 having rounded or curved ends, which blades 66 and 68 are preferably slightly longer than the blades 67 and 69. Mounted on each of the said blades 66, 67, 68 and 69 are power-plants 70, 71, 72 and 73, respectively, such as internal combustion engines, Diesel engines, or any desired power plant, and having the propellers attached thereto, as shown. The motors and propellers 70, 71 and 72 work as tractors, and motor 73 and its propeller as pusher.

The blades 66, 67 and 69 are provided with the usual interior supporting structure of any desired type, and also have spars 74, 75 and 76, respectively, therein, which spars terminate at their inner end into stud-shafts 78, 79 and 80, respectively, which extend beyond the inner ends of the blades and are rotatably received in sockets 81, 82 and 83 (socket 81 and 83, not shown) which sockets are formed integrally with the flange 46 of the blade supporting hub 40, see Fig. 10, thus enabling the blades 66, 67 and 69 to be given their proper angle of attack or inclination.

The blade 68, has no connection whatever with blade supporting hub 40, and is supported by struts from beneath same and a support above same, later described. The blade 68, see Fig. 31, is provided on its underside with a recess 86 into which a turn-table-like structure 87 is positioned. The turn-table is composed of two parts, namely an upper part 88 fixed in the recess to the blade, in any desired manner, and having a dove-tailed rib 89 fitting into a correspondingly shaped groove in the lower part 90 and to which lower part the struts are attached. Ball or roller bearings 91 are placed in the groove to permit blade 68 to be partially rotated 180° in a horizontal plane. A stud-shaft 92 is fixedly secured centrally to the upper half 88 of the turn-table and projects vertically upwardly, through and beyond the upper side of the blade 68 and forms a vertical pivot for the blade 68, and also a mounting for a gear hereinafter referred to, whereby the blade is movable horizontally through 180° of an arc of a circle for a purpose later to be seen and described.

The power-plants 70 and 72 are fixedly mounted, in any desired manner, intermediate of the ends of blades 66 and 68, respectively, while the power-plants 71 and 73 are movably mounted adjacent the ends of blades 67 and 69, respectively, and are adapted to be swung 90° horizontally on a vertical pivot. The power plants 71 and 73 are mounted identically and only one will be described, see Figs. 28 to 30, inclusive, wherein it will be seen that the end of the blade is open or cut-out at 95, which opening extends from one side at a point 96 to the extreme end of the blade at a point 97. The motor 71 extends partially into the blade and is pivoted at 98 to an upstanding stub-shaft 99 which shaft is fixed in a support 100 which in turn is secured at 101 to a carriage sector 102. The carriage sector 102 has its ends attached as at 102' to the ends of horizontally extending supporting beams 103. A sprocket gear 104 is splined to the shaft 99 and is disposed beneath the support 100 and the lower face of same rests on ball-bearings 104' positioned in a raceway formed in the connecting web 105 of the carriage sector. A second ball raceway 106' is formed in the upper face of the support 100 upon which rests the end of motor 71 whereby an anti-friction vertical pivot for the motor is formed.

Intermediate the ends of the motor 71 and on the underside thereof there is formed, or is attached thereto, a sector-shaped carriage support 106 having a dove-tailed rib 107 thereon which is complementary to and enters a correspondingly shaped groove 108 formed in the carriage sector 102 and in which groove roller bearings 109 are disposed, thereby providing an antifriction mount for the motor intermediate its ends. The gear 104 has a sprocket chain trained therearound, and as hereinafter described, effects horizontal rotation of motor 71 on a vertical pivot through 90° of an arc of a circle. A movable closure 110 of flexible metal, or other desirable material, is provided for the open end of the wing and is substantially semi-circular and conforms to the contour of the shape of the wing. The motor 71 extends through an opening 111 intermediate the ends of this closure, and it will be seen in Fig. 28 that when the motor 71 is swung to the right on its pivot through 90° the section 112 of the closure will close the opening 95 in the end of the blade and the section 113 will simply be pushed back in the hollow space in the wing.

An endless sprocket chain 115, see Fig. 8, is trained around gear 104, and also around gear 41, and extends through spaced openings 116 in the flange of blade supporting hub 40 and through registering openings 117 in the inner curved end of the blade 67 and is maintained relatively taut. A second endless sprocket chain 118 is crossed intermediate its ends as shown and is trained around gear 42, and also around gear 104' and extends through spaced openings 119 in the flange of blade supporting hub 40 and through registering openings 120 in the inner curved end of the oppositely disposed blade 69 and is also maintained relatively taut. A third endless sprocket chain 121 is trained around gear 43 and extends through spaced openings in the flange 45 and extends radially outwardly, parallel with, above, and over a portion of the blade 68 and is also trained around gear 122 which is fixed to the shaft 92.

The manual control for obtaining the proper angle of attack, or incidence, or inclination of the blades 66, 67, 68 and 69 comprises an elongated operating tubular member, denoted, as a whole, at 123, and having a hand-wheel 124 fixed at its lower end and provided intermediate its ends with an exterior high-pitch high-speed screw 125 which is complemental to the interior screw threads 29 in the disk 25 whereby the disk 25 may be raised and lowered vertically when the operating member 123 is turned by means of the hand-wheel 124. Fitted within and fixedly secured to the operating member 123 is a tubular extension member 126 which extends through and beyond the tubular connecting member 37 into the enclosure formed by the bell-shaped housing 35. The connecting member 37 adjacent its upper end is provided interiorly with two superposed depressions or cavities 127 and 128, which cavities are connected by a vertically extending groove 129 in the side wall of the connecting member 37. The tubular extension member 126 is provided with an opening 130 through which a locking detent 131 projects, and which detent 131 is forcibly urged outwardly by a strong coiled spring 132, the spring being enclosed in a socket 133. The detent 131 is adapted to slide in the vertical groove 129 and when operating member 123 as a whole is raised or lowered, the detent 131 will snap into either of the cavities 127 or 128, according to the movement of the operating member, and will be securely locked either in upper or lower position until manually released, and the detent operating in the groove 129 will also prevent rotation of the operating member 123, as a whole, and allow it to only be moved vertically in a predetermined fixed path.

The upper end of the tubular extension member 126 is forked, or rather, provided with a laterally extending inclined arm 135 having a hollow vertically disposed free end 136, into which a shaft 137 is rotatably mounted in any desired manner. A gear 138 is splined to shaft 137 intermediate its ends and another gear 139 is splined to shaft 137 at its upper end and is adapted to mesh with gear 41, when operating member 123 is moved to its upper position. A long rod, or tubular shaft 140, which is concentrically disposed with respect to operating member 123 and its extension 126, projects beyond the hollow extension member 126 and has a gear 141 splined thereon which gear 141 is directly opposite gear 138 on shaft 137 and an endless chain 142 is trained around and connects and forms a drive for gears 138 and 141 when operating member 123 is turned. A gear 143 is also splined to the extreme upper end of the rod 140 and is adapted in one position, namely the upper position, to mesh with gear 43, see Fig. 14.

The rotatable hub or collar 7 and its radially outwardly extending diametrically disposed lugs 7ᶜ and 7ᵈ form an attachment or supporting means for the lower ends of struts 145, which struts 145 are connected at their upper ends to each of the blades 66, 67 and 69 and at their lower ends to the hub in identically the same manner, and, therefore, only one of the blades and strut connections will be described.

See Figs. 32, 35, and 36 wherein the struts are shown connected to lug 7ᶜ by means of a bolt or like fastening means 146 which passes through registering openings 147 adjacent the lower ends of the struts. A bushing 148 is positioned in one of the openings in the strut to prevent binding the ends thereof so that the struts will be capable of a pivotal movement. One of the struts 145 at its upper end is pivotally connected at 149 to a fixed lug 149', which lug 149' is on the bottom side of blade 66, and the upper end of the other strut 145 is pivotally connected at 149ᵃ in a slideway 150, which slideway is also fixed to the bottom side of blade 66. Other struts 151 are connected at their upper ends to the underside of turntable part 90 in identically the same manner as described with regard to blade 66. The lower ends of struts 151 are pivotally connected to one of the lugs on the hub 7 as at 154. The aforementioned struts, it will be seen, act to support blades 66, 67, 68 and 69 from underneath the same.

To support the blades 66, 67 and 69 from above, a freely rotatable cap 155 is placed on the extreme upper end of standard 1. This cap is in two parts and is held together by bolts or the like 156. Suitable ball races 157 and 158 are arranged interiorly of the cap and surround a portion of the standard 1 adjacent its extreme upper end, as shown, see Fig. 10. The cap 155 is provided with four diametrically disposed ribs or lugs 159 which extend radially outwardly, see Fig. 11, and three of these lugs are provided with openings 160 through which brace wires 161 are looped and the free ends thereof are spacedly secured in any desired manner to the tops of the blades 66, 67 and 69, as shown at 162, thereby affording sliding movement of the brace wires 161 in the openings 160 when the said blades are moved or angled. The upper support for blade 68 consists of a rigid brace 163 secured at its upper end at 163' to one of the lugs 159 on the cap 155, and connected at its lower end to the extreme upper end of shaft 92 by means of a universal joint or like connection 152.

To operatively obtain the proper angle of attack or inclination of the blades 66, 67, 68 and 69 four suitable distorted bell-crank levers 165, 166, 167 and 168 are provided. The bell crank levers are each pivotally connected at 169 and 170 at diametrically opposite points to the rotatable rings 23 and 32, respectively.

The upper free ends of the bell-crank levers are curved inwardly and are provided with openings into which the lower ends of rigid rods or the like 171 are positioned and pivotally held in any desired manner, for instance, as by providing shoulder 171', and nut 171ª, and the rods incline upwardly and have their upper ends pivotally secured at 172 to bracket 150 on the undersides of the blades 66, 67, 68 and 69. Bell-crank levers 165 and 167 are of identical size and formation and have the same amount of leverage, and through their respective rods 171 cause adjustment of the angle of blades 67 and 69, respectively. Bell-crank lever 166, however, is slightly larger and has more leverage than the other levers and must necessarily be so constructed inasmuch as the angle of blade 68 to which it is connected through the medium of rod 171, requires inclination both in the position as shown in Fig. 8 for horizontal flying and inclination after it is swung 180° to operate as a helicopter. The bell-crank lever 168 which controls the inclination of blade 66 through the medium of rod 171 requires the least angle of inclination, and therefore, lever 168 is smaller and has less leverage than the other levers, and this is due to the fact that blade 66 is stationary except for slight angling on a horizontal pivot.

A gearing braking or locking operating cable 175 extends upwardly through the casing 3, through the opening 28 in disk 25, through opening 176 in top of casing 3', through opening 38 in bell-housing 35 where it is forked or split at 175' and is secured at its upper ends to the outer ends of levers 52 and 56, and the other end of cable 175 is extended within the body of the plane, see Fig. 7, and is trained over a pulley 177 and has its end attached at 178 to operating lever D. The operating lever D, see Figs. 37 to 39, inclusive, is pivotally mounted at 179 to an upstanding bracket 180, which bracket is suitably secured, in any desired manner, to the floor of the plane. The bracket 180 is preferably in two parts and is held together by means of bolts or other desirable securing means 180' which pass through spacing sleeves 181.

An arcuate channel guide 185 is formed in the lower portion of bracket 180, into which an arcuate slide 186 is positioned and is adapted for sliding movement in a fixed curved path therein. A second brake operating cable 187 is secured at its upper end to the outer end of brake operating lever 188, which lever is forked at its other end and partly surrounds casing 3 and is pivoted thereto at 189 and forces brake ring 12 upwardly when pulled downwardly and the other end or lower end of cable 187 is secured to the end 186' of the slide 186.

The operating lever D is hollow and is provided at its upper end with an outwardly spring-pressed button 188ª, which controls, in any desired manner, a detent 191 which is adapted to enter recess or depression 192 adjacent the end of the arcuate slide 186.

A ratchet and pawl mechanism 193 is formed on one side of the bracket 180 and has its operating rod 194 extending upwardly parallel with the operating lever D, whereby the lever D is held in its several positions until manually released as by gripping the pivoted lever 195 to release the pawl from the ratchet.

Operation of the device

With the various parts in their respective positions as shown in Figs. 1 to 3, inclusive, Fig. 10 and Fig. 37, with all four motors running and assuming that proper altitude has been reached by vertical or substantially vertical ascent, and that horizontal flying, as in conventional aeroplanes, is desired—the pilot simply pulls lever D from position I (see Fig. 37) to position II and detent 191 will snap into the depression 192 in the arcuate slide 186 and simultaneously with this movement of lever D, brake operating levers 52 and 56 will be pulled downwardly through the medium of cable 175, and thereby stops rotation of gears 41, 42 and 43 by means of the friction lining.

When the gears are thus stopped rotating, the endless chains 115, 118 and 121 will start moving and transfer motion to gears 104, 104' and 122 and thereby effect horizontal turning of motors 71 and 73 through 90° of an arc of a circle, and the turning of gear 122 effects horizontal turning of blade 68 and its motor through 180° of an arc of a circle. When this is accomplished, lever D is moved back to position I and thereby moves slide 186 to dotted line position, which through the medium of cable 187 and movement of slide 186 exerts a downward pull on brake lever 188 and stops rotation of hub 7 by means of friction created by forcing brake ring 12 upwardly into engagement with brake flange 10, and the rollers in brake ring cooperating with the corresponding depressions in brake flange 10 will effect stoppage only at a predetermined position with respect to the fuselage, so that the blade assembly will then be as shown in Figs. 4 to 6, inclusive, at which instant horizontal flying will be attained. Then the pilot turns control-wheel 124 to the left and through the medium of the screw 125 the disk 25 will be moved, and thereby obtain the proper angle of attack, or inclination of all of the blades to effect a more effective horizontal flying. It will therefore be seen that by simply moving the lever D back and forth and by slightly turning hand-wheel 124 the machine is converted from the helicopter principle to that of a conventional aeroplane.

For reconverting from horizontal flying to helicopter, the pilot simply turns the hand-wheel 124 to the right, until screw 125 is dislodged from screw-threads 29, which changes the angle of attack of the blades and he then forcibly lifts the hand-wheel 124 and the entire operating member 123 upwardly, releasing, or rather removing, detent 131 from lower recess 128 and moving same upwardly in groove 129 until it snaps in upper recess 127 where it will be locked and in doing so (see Fig. 14), the gear 139 will mesh with gear 41 and gear 143 will mesh with gear 43, it being understood that the said gears when in their upper position are disposed between, or rather straddled by the respective endless chains on the respective gears. Now the hand-wheel 124 is turned again to the right and through the medium of chain 142, gear 138, gear 141, gear 139 and gear 143—the gears 41, 42 and 43 will be rotated and in turn cause movement of chains 115, 118 and 121 and effect turning of motors 71 and 73 from the positions in Fig. 8 through 90° horizontally and also turn entire blade 67 and its motor through 180° horizontally. Then by simply pulling down on hand-wheel 124, thereby releasing detent 131 from upper recess 127, the entire operating member 123 will fall by gravity until detent 131 snaps into lower recess 128 and locks same in lower position and by pressing on button 188 the detent 191 is released from slide 186 and it goes back to its original position, and brake ring 12 which also will fall by gravity away from brake flange 10 and thereby permit rotation of the entire blade assembly. It is to be understood that in moving lever D, from position I to position II the pilot must also grip lever 195 so as to release the pawl from the ratchet. It will be seen that the pawl and ratchet mechanism maintains the lever D in its several shifted positions.

From the foregoing it will be seen that I have provided an air-craft that may be flown as a helicopter or as a conventional aeroplane, and when the braking means are disengaged, the multi-blade assembly will be capable of a free rotation, and, if the motive power fails, auto-rotation will be effected and a safe landing be made. It is to be understood that when the machine is to be operated on the auto-rotation principle, the blades will be adjusted, minus 3° to plus 5°, as to their angle of attack or inclination.

The machine, as constructed, is light in weight and embodies sound aeronautical principles; the motors are relatively light in weight and are capable of propelling the machine at a high rate of speed. The operating mechanism for the control of the blades and for converting the machine from a helicopter to a conventional aeroplane and vice versa is relatively simple and inexpensive and capable of long and efficient use. It is to be distinctly understood that while I have shown four blades 66, 67, 68 and 69, the machine will fly, as aforesaid, by using only two of such blades, namely blades 66 and 68. However, four blades, or more, if desired, are conducive to more effective flying of the machine.

I desire it further understood that in mentioning aeroplane and helicopter herein, such are to be considered in their broader aspect as regards the type of machine. In other words, I contemplate use of my invention with any type of heavier-than-air, or lighter-than-air machine. Fuel may be supplied to the power plants in any desired manner, and be under control of the pilot within the fuselage.

I claim:—

1. An aircraft of the character described comprising an elongated fuselage, a rotatable multi-bladed lift and sustaining assembly consisting of four blades mounted above and associated with the fuselage, motive power means adjacent the extreme free ends of two of said blades and intermediate of the ends of two of the blades for rotating the said assembly whereby the machine may be flown as a helicopter, and means for braking and stopping rotation of and locking the wing assembly in a predetermined position so that two of the blades are parallel with and spaced above the elongated fuselage, and another two of said blades are projecting substantially at right angles beyond and above opposite sides of the fuselage adjacent the forward end thereof and in such position the machine may be flown horizontally.

2. An aircraft of the character described comprising an elongated fuselage, a multi-bladed lift and sustaining assembly rotatably supported above the fuselage, power plants having a propeller attached, mounted adjacent the extreme free ends of two of the blades and intermediate of the ends of two of the blades, three of which power plants and propellers propel the aircraft as tractors, and a fourth motor and propeller adjacent the extreme free end of one of said blades which propels as a pusher.

3. An aircraft as defined in claim 2, wherein one of the blades having a power-plant with a propeller thereon fixedly secured thereto intermediate its ends, is capable of movement independently of said other blades 180° horizontally on a vertical pivot.

4. An aircraft of the character described comprising an elongated fuselage, a lift and sustaining assembly rotatable as a unit, comprising four elongated blades of similar contour extending radially outwardly from diametrically oppositely disposed points from a supporting standard, two of said blades each having a power plant fixedly secured thereto intermediate of the ends thereof, and the other two of said blades each having a power plant pivotally secured at their ends and capable of movement through 90° of an arc of a circle, and one of the said blades having the power plant intermediate its end being so supported so as to be moved 180° horizontally through an arc of a circle.

5. An aircraft of the character described comprising an elongated fuselage, an upright supporting standard secured to and projecting vertically above the fuselage, a lift and sustaining assembly rotatable as a unit mounted on said projecting portion of the standard and having four similarly shaped elongated blades each having a power plant thereon and extending radially outwardly from diametrically opposite points on the standard, a rotatable hub on the standard into which three of the blades are mounted at their inner ends so as to have a movement to thereby enable the said blades to be angled, the fourth blade being capable of movement 180° horizontally, means on the standard and under control of the pilot to effect angling of all of the said blades, and braking means mounted on the standard and also under control of the pilot for stopping rotation of the lift and sustaining assembly as a whole.

6. An aircraft as defined in claim 5, wherein the braking means effects stoppage of the rotatable lift and sustaining assembly at a predetermined position so that two of the blades are parallel with the fuselage and the other two blades including the blade rotatable through 180° horizontally project beyond the sides of the fuselage at substantially a right angle thereto.

7. An aircraft of the character described comprising an upright supporting standard secured to and projecting vertically above the fuselage, a rotatable hub mounted on the projecting portion of said standard, a lift and sustaining assembly consisting of four similarly shaped blades, three of which blades are mounted at their inner ends in the said hub so as to have movement therein, a rotatable brake hub mounted on said standard below the first mentioned hub, struts, the said struts being anchored at their lower ends to the brake hub and at their upper ends to the under sides of the blades, means attached to the extreme upper end of the standard with which supporting means are associated and attached to each of the blades on their upper surfaces, means mounted on the standard and under control of the pilot for effecting change of angle of inclination of the blades, and braking means engageable with said brake hub to stop rotation of the blade assembly, the said brake hub and braking means being so constructed so that upon stoppage of the blade assembly the blades thereof will be in a predetermined position with respect to the fuselage.

8. An aircraft braking structure as defined in claim 7, wherein the braking means is in the form of a non-rotatable ring and surrounds the standard and the brake hub also surrounds the standard in superposed relationship with respect to the brake ring.

9. An aircraft braking structure as defined in claim 7, wherein the braking means is in the form of a non-rotatable ring and surrounds the standard and the brake hub also surrounds the standard in superposed relationship with respect to the brake ring, and the brake ring having different size rollers mounted therein at oppositely spaced points, which rollers are adapted to enter correspondingly shaped and sized depressions in the brake hub whereby stoppage of the blade lift and sustaining assembly is effected at a predetermined position with respect to the fuselage.

10. A four-bladed rotatable lift and sustaining assembly of the character described, wherein two of said blades each have a power plant mounted on a vertical pivot adjacent their outer ends, the other two blades each having a power plant intermediate of their ends, one of said last mentioned blades being mounted so as to be capable of movement in a horizontal plane and the other of said last mentioned blades being stationarily mounted, automatic and manual means for effecting movement of each of the first mentioned motors in a horizontal plane and also the said blade capable of movement in a horizontal plane.

11. A lift and sustaining assembly for aeroplanes comprising two similarly shaped blades adapted to project beyond opposite sides of an aeroplane fuselage, each having a power plant associated therewith, one of said blades being, at will, stationarily mounted except for inclination thereof, the other blade being mounted so as to be inclined and also rotated 180° through an arc of a circle in a horizontal plane independently of said other blade.

12. A lift and sustaining blade assembly for aircraft comprising at least two blades, one of said blades being, at will, stationarily mounted except for angling or inclination thereof and the other blade being mounted so as to be inclined or angled and also rotated 180° through an arc of a circle in a horizontal plane.

YÜRGEN BARON SILBERG
VON STACKELBERG.